United States Patent
Vollmer (10) Patent No.: US 9,461,511 B2
(45) Date of Patent: Oct. 4, 2016

(54) ELECTRIC MACHINE WITH PERMANENTLY EXCITED ARMATURE AND ASSOCIATED PERMANENTLY EXCITED ARMATURE

(71) Applicant: Siemens Aktiengesellschaft, München (DE)

(72) Inventor: Rolf Vollmer, Gersfeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 299 days.

(21) Appl. No.: 13/832,913

(22) Filed: Mar. 15, 2013

(65) Prior Publication Data

US 2013/0241335 A1    Sep. 19, 2013

(30) Foreign Application Priority Data

Mar. 16, 2012   (EP) .................................... 12159926

(51) Int. Cl.
    *H02K 21/12*    (2006.01)
    *H02K 1/27*     (2006.01)

(52) U.S. Cl.
    CPC .......... *H02K 1/2773* (2013.01); *H02K 1/2713* (2013.01)

(58) Field of Classification Search
    CPC ............................. H02K 21/02; H02K 1/27
    USPC ............ 310/156.43, 156.54, 156.55, 156.62,
                   310/156.07, 156.25, 156.34, 156.39,
                   310/156.42, 156.68, 216.106, 216.114, 400
    See application file for complete search history.

(56) References Cited

U.S. PATENT DOCUMENTS

| | | | |
|---|---|---|---|
| 3,991,331 A | 11/1976 | Noodleman | |
| 4,481,437 A * | 11/1984 | Parker ................. | H02K 1/2706 310/154.43 |
| 6,483,221 B1 | 11/2002 | Pawellek et al. | |
| 6,628,031 B2 | 9/2003 | Vollmer | |
| 6,768,238 B2 | 7/2004 | Knauff et al. | |
| 6,812,612 B2 | 11/2004 | Schunk et al. | |
| 6,858,965 B2 | 2/2005 | Mueller et al. | |
| 6,885,187 B2 | 4/2005 | Duenisch et al. | |
| 6,943,467 B2 | 9/2005 | Potoradi et al. | |
| 7,141,905 B2 | 11/2006 | Vollmer | |
| 7,285,883 B2 | 10/2007 | Bott et al. | |
| 7,564,158 B2 | 7/2009 | Huth et al. | |
| 7,705,507 B2 | 4/2010 | Vollmer | |
| 7,709,984 B2 | 5/2010 | Braun et al. | |
| 7,732,967 B2 | 6/2010 | Schunk et al. | |
| 7,755,315 B2 | 7/2010 | Bott et al. | |

(Continued)

FOREIGN PATENT DOCUMENTS

| | | |
|---|---|---|
| CN | 101092225 A | 12/2007 |
| EP | 1 416 617 A1 | 5/2004 |

(Continued)

*Primary Examiner* — Jose Gonzalez Quinones
(74) *Attorney, Agent, or Firm* — Henry M. Feiereisen LLC.

(57) ABSTRACT

An electric machine includes a stator and an armature which together bound an air gap via which the stator interacts with a magnetic field of a magnetically active part of the armature. The armature includes as the magnetically active part permanent magnets and magnetically soft flux conducting elements which are arranged between the permanent magnets. The magnetically active part of the armature is in at least one direction of extent longer than a magnetically soft flux conducting device of a magnetically active part of the stator in the direction of extent.

8 Claims, 5 Drawing Sheets

(56) References Cited

U.S. PATENT DOCUMENTS

| | | |
|---|---|---|
| 7,777,373 B2 | 8/2010 | Bott et al. |
| 7,859,160 B2 | 12/2010 | Vollmer |
| 7,915,777 B2 | 3/2011 | Vollmer |
| 7,977,826 B2 | 7/2011 | Vollmer et al. |
| 8,026,640 B2 | 9/2011 | Bott et al. |
| 8,035,371 B2 | 10/2011 | Budde et al. |
| 8,063,517 B2 | 11/2011 | Bott et al. |
| 8,115,360 B2 | 2/2012 | Vollmer |
| 8,134,273 B2 | 3/2012 | Vollmer et al. |
| 8,227,951 B2 | 7/2012 | Grossmann et al. |
| 8,283,815 B2 | 10/2012 | Vollmer |
| 8,378,541 B2 | 2/2013 | Vollmer |
| 2003/0011267 A1 | 1/2003 | Vollmer |
| 2003/0094940 A1 | 5/2003 | Duenisch et al. |
| 2003/0173853 A1 | 9/2003 | Knauff et al. |
| 2004/0075359 A1 | 4/2004 | Mueller et al. |
| 2004/0084989 A1 | 5/2004 | Schunk et al. |
| 2004/0155539 A1 | 8/2004 | Potoradi et al. |
| 2004/0261553 A1 | 12/2004 | Bott et al. |
| 2005/0231060 A1 | 10/2005 | Vollmer |
| 2006/0219880 A1 | 10/2006 | Braun et al. |
| 2006/0290221 A1 * | 12/2006 | Hsu .................. 310/156.53 |
| 2007/0035193 A1 | 2/2007 | Huth et al. |
| 2007/0040466 A1 | 2/2007 | Vollmer |
| 2007/0114861 A1 | 5/2007 | Bott et al. |
| 2007/0257566 A1 | 11/2007 | Vollmer |
| 2007/0257575 A1 | 11/2007 | Vollmer |
| 2007/0267930 A1 * | 11/2007 | Ogava .................. 310/156.53 |
| 2008/0073985 A1 | 3/2008 | Bott et al. |
| 2008/0164777 A1 | 7/2008 | Braun et al. |
| 2008/0169718 A1 | 7/2008 | Bott et al. |
| 2008/0185931 A1 | 8/2008 | Platen et al. |
| 2008/0197741 A1 | 8/2008 | Schunk et al. |
| 2008/0197742 A1 | 8/2008 | Vollmer |
| 2008/0289440 A1 | 11/2008 | Denk et al. |
| 2008/0315704 A1 | 12/2008 | Vollmer |
| 2009/0009114 A1 | 1/2009 | Schunk et al. |
| 2009/0015080 A1 | 1/2009 | Vollmer et al. |
| 2009/0039713 A1 | 2/2009 | Bott et al. |
| 2009/0072634 A1 | 3/2009 | Vollmer |
| 2009/0152959 A1 | 6/2009 | Vollmer |
| 2009/0152976 A1 | 6/2009 | Bott et al. |
| 2009/0160283 A1 | 6/2009 | Bott et al. |
| 2009/0184602 A1 | 7/2009 | Braun et al. |
| 2009/0206686 A1 | 8/2009 | Vollmer |
| 2009/0212644 A1 | 8/2009 | Bott et al. |
| 2009/0218904 A1 | 9/2009 | Vollmer |
| 2009/0251013 A1 | 10/2009 | Vollmer et al. |
| 2009/0295236 A1 | 12/2009 | Bott et al. |
| 2009/0295251 A1 | 12/2009 | Vollmer et al. |
| 2009/0302832 A1 | 12/2009 | Budde et al. |
| 2009/0315424 A1 | 12/2009 | Vollmer |
| 2009/0322174 A1 | 12/2009 | Grossmann et al. |
| 2010/0000830 A1 | 1/2010 | Budde et al. |
| 2010/0013332 A1 | 1/2010 | Vollmer |
| 2010/0013333 A1 | 1/2010 | Vollmer |
| 2010/0013341 A1 | 1/2010 | Vollmer |
| 2010/0052466 A1 | 3/2010 | Vollmer et al. |
| 2010/0264770 A1 | 10/2010 | Braun et al. |
| 2011/0006617 A1 | 1/2011 | Budde et al. |
| 2012/0025654 A1 | 2/2012 | Bach et al. |
| 2012/0038228 A1 | 2/2012 | Vollmer |

FOREIGN PATENT DOCUMENTS

| | | |
|---|---|---|
| FR | 2846482 A1 * | 4/2004 |
| GB | 1 487 877 A | 10/1977 |
| JP | 58139665 A * | 8/1983 |

* cited by examiner

ELECTRIC MACHINE WITH PERMANENTLY EXCITED ARMATURE AND ASSOCIATED PERMANENTLY EXCITED ARMATURE

CROSS-REFERENCES TO RELATED APPLICATIONS

This application claims the priority of European Patent Application, Serial No. 12159926, filed Mar. 16, 2012, pursuant to 35 U.S.C. 119(a)-(d), the content of which is incorporated herein by reference in its entirety as if fully set forth herein.

BACKGROUND OF THE INVENTION

The present invention relates to an electric machine.

The following discussion of related art is provided to assist the reader in understanding the advantages of the invention, and is not to be construed as an admission that this related art is prior art to this invention.

An electric machine of a type involved here has a stator and an armature, with the armature including as the magnetically active part permanent magnets as well as magnetically soft flux conducting elements arranged between them. The magnetically active part of the armature is the constituent which is involved to a significant extent in the actual magnetic interaction between the stator and armature via the air gap of the electric machine. To be distinguished therefrom is the part of the armature that simply supports the magnetically active part and serves to mechanically transmit forces, i.e. in the case of a rotor for example its shaft.

In order for an electric machine to generate sufficient torque within a given installation space during operation of the motor, attempts have been made to provide a greatest possible magnetic flux density in the region of the air gap between the stator and armature of the electric machine. In the case of electric vehicles, for example, for a drive motor it is necessary to provide a flux density measuring an average of 0.6 to 0.8 tesla in the air gap. Same considerations apply, when a generator is involved with reference to generating an electric voltage.

In the case of permanently excited armatures, i.e. armatures that are not electrically energized via coils and the magnetic field of the armature is produced solely via permanent magnets, adequate flux density can be produced via a suitably large number of permanent magnets. This requires the provision of a large number of poles in the armature. That in turn causes a high remagnetization frequency in the armature and stator as a result of fast-changing stator fields, e.g. at high rotational speeds. When a drive motor for an electric vehicle is involved, the rotor should be able to rotate in the range of 5000 to 10000 revolutions per minute. That can cause substantial eddy currents and hence cause the electric machine to become very hot.

It would be desirable and advantageous to provide an improved electric machine to obviate prior art shortcomings and to enable transmission of a large torque, even when rotational speeds are high.

SUMMARY OF THE INVENTION

According to one aspect of the present invention, an electric machine includes an armature having a magnetically active part comprising first permanent magnets, magnetically soft flux conducting elements respectively arranged between the first permanent magnets, and second permanent magnets arranged on a plurality of the flux conducting elements along a direction of extent and having a magnetization oriented parallel to the direction of extent, a stator defining with the armature an air gap via which the stator interacts with a magnetic field of the magnetically active part of the armature, the stator having a magnetically active part comprising a magnetically soft flux conducting device, the magnetically active part of the armature being sized to extend in the direction of extent beyond the magnetically soft flux conducting device of the magnetically active part of the stator, and a magnetically soft feedback element magnetically coupling the second permanent magnets with one another, with a magnetic flux of the second permanent magnets being closed on an end face of the armature.

An electric machine of a type described in the following description relates in particular to an electric machine having a rotor, involves preferably a synchronous machine and a servomotor, and is suitable particularly as a drive for an electric vehicle. The invention is however not limited in this regard and may also involve e.g. a linear motor.

The present invention enables a high magnetic air gap induction, i.e. flux density, to be provided with a relatively small number of poles. The active part of the armature is for that purpose sized longer than the active part of the stator. The magnetically active part of the armature includes permanent magnets as well as magnetically soft flux conducting elements that are arranged between them and conduct the magnetic flux produced by the permanent magnets. The magnetically active part of the armature is now in at least one direction of extent longer than a magnetically soft flux conducting device of a magnetically active part of the stator in the direction of extent. The magnetically soft flux conducting device of the stator is typically a lamination stack in which electric coils of the stator are embedded.

The invention is based on the knowledge that a magnetic field issuing from the magnetically active part of the armature projecting beyond the stator does not necessarily act as a stray field, i.e. without benefit for transmitting torque. Instead, field lines of the field extend from the projecting part of the armature up to the edge of the air gap and enter the magnetically soft parts of the stator. The result is a field concentration in the air gap of the electric machine at the edge of the magnetically soft part of the stator so that the field strength of the magnetic field is increased as compared with a conventional electric machine.

An electric machine according to the invention can be combined especially well with an armature having a magnetically active part which itself is configured for further flux concentration. Magnetic-flux concentration thus already takes place within the armature itself. That is achieved by orienting the magnetization of a permanent magnet not in the direction of the air gap but transversely thereto. The magnetization of the permanent magnet is thus oriented transversely to a normal vector of the surface region where the magnetic flux exits or reenters the armature. Orientation transverse to the normal vector means that the normal vector and magnetization enclose an angle in the range of 45 to 135°, particularly in a range between 75 to 105°. A perpendicular orientation is especially advantageous. In the event, the armature is embodied as a rotor, i.e. its basic shape is cylindrical, the permanent magnet is magnetized tangentially to the circumferential direction of the rotor and a flux concentration is established which is radially oriented.

As a result of this orientation of the magnetization of a permanent magnet, the magnetic field issuing at its north pole is diverted away from the adjacent flux conducting element in the direction of the air gap, thereby realizing a condensing of the magnetic field in so that in the air gap there will be a magnetic field having a greater flux density than at the surface of the permanent magnet itself. Analogous conditions are established at the south pole of the permanent magnet, where the magnetic field reenters the permanent magnet. Field concentration as a result of the magnetically active part of the armature also permits the use of magnets having a low magnetic flux density, particularly ferrite magnets, while still obtaining the desired high flux density in the air gap.

The magnetic flux density in the region of the air gap is even further increased when the magnetically active part of the armature has on its end projecting beyond the stator further permanent magnets which are also arranged on one of the flux conducting elements. Magnetization of the permanent magnets is then oriented parallel to the direction of extent along which the rotor projects beyond the stator. Orientation of magnetization parallel to the direction of extent means hereby that the magnetization and an axis defined by the direction of extent enclose an angle in the range of 0 to 45°, particularly from 0 to 15°. In the event, the armature is configured as a rotor, this means that the rotor extends in the axial direction along the rotational axis beyond the stator, and axially magnetized permanent magnets are arranged on an end of a flux conducting element on the end face of the rotor.

As a result of the presence of additional permanent magnets on the end of the flux conducting element, an additional flux is fed into the flux conducting element and concentrated in the flux conducting element and transmitted inside the air gap to the stator. When permanent magnets are used having a magnetization oriented parallel to the direction of extent, there is no need for the magnetically soft flux conducting elements to also project beyond the magnetically soft part of the stator.

Permanent magnets oriented parallel to the direction of extent can be arranged on each of a plurality of flux conducting elements on one end of the armature. The permanent magnets are mutually magnetically coupled among themselves via a magnetically soft feedback element. The stray flux will be kept low thereby despite the additional permanent magnets.

The permanent magnets magnetized parallel to the direction of extent can of course be attached to both ends of the armature and project beyond the stator in the direction of extent.

The armature according to the invention has at least one flux conducting element which is bordered on four different sides by at least one permanent magnet on each of the sides. The flux conducting element couples the adjacent permanent magnets to a surface region on an external side of the armature, specifically on the external side which with the armature bounds the air gap, when the armature is installed. The permanent magnets bordering the flux conducting element have magnetizations pointing all either toward or away from the flux conducting element. A magnetic pole of the armature having a particularly high flux density is thereby produced on these surface regions. The armature according to the invention can be embodied as a rotor. It is structured as follows: In a cross-section perpendicular to the rotational axis of the rotor, permanent magnets magnetized tangentially to the circumferential direction are arranged radially around a shaft of the rotor with wedge-shaped laminations respectively arranged between the permanent magnets. The individual laminations are thus bounded by a permanent magnet on two different sides. Further, axially magnetized permanent magnets are arranged on the lamination on the end faces of the rotor. As a result, there are two further permanent magnets per lamination that border the lamination, i.e. a total of four permanent magnets per lamination.

In the context of designing the magnetically soft flux conducting elements of the armature, it should be taken into account that the flux conducting elements conduct a magnetic flux also in the direction in which the armature projects beyond the stator, i.e. especially along the rotational axis in the case of a rotor. Lamination stacks have shown to be suitable as flux conducting elements, as employed in electric machines in regions in which eddy currents have to be suppressed. Lamination stacks are formed from magnetically soft metal sheets that have been stacked to form a lamination stack, with an electrically insulating layer been provided between the individual laminations for blocking the eddy currents. While good conductivity for a magnetic flux within a lamination is present anyway, when the magnetic flux is conducted across a plurality of layered sheets, care should be taken to configure the electric insulation suitably thin. When that is the case, it is possible to conduct a magnetic flux both axially and radially in a rotor for example, and to condense it.

According to another advantageous feature of the present invention, the armature can have a number of pairs of poles of less than six, and a flux density in the air gap measures on average more than 0.6 tesla, even more than 0.7 tesla. That is in particular possible also when ferrite magnets are provided as permanent magnets.

According to another aspect of the present invention, an armature configured as a rotor for an electric machine includes a shaft, first permanent magnets arranged radially around the shaft and magnetized tangentially to a circumferential direction in a cross-section perpendicular to a rotational axis, magnetically soft flux conducting elements respectively arranged between the first permanent magnets and configured as wedge-shaped stacks of lamination, and second axially magnetized permanent magnets arranged on axial end faces of the flux conducting elements so that each flux conducting element is bounded on four different sides by the first and second permanent magnets, respectively, the flux conducting element magnetically coupling the first and second permanent magnets with a surface region of an external side of the rotor, the first and second permanent magnets having magnetizations all either pointing toward or away from the flux conducting element to thereby form a magnetic pole on the surface region.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In the examples described below, the components of the electric machine constitute individual features of the electric machine that are to be regarded as mutually independent and refine the electric machine also independently of one another so that these components should be considered individually or in any combination as part of the invention.

Figure 1:
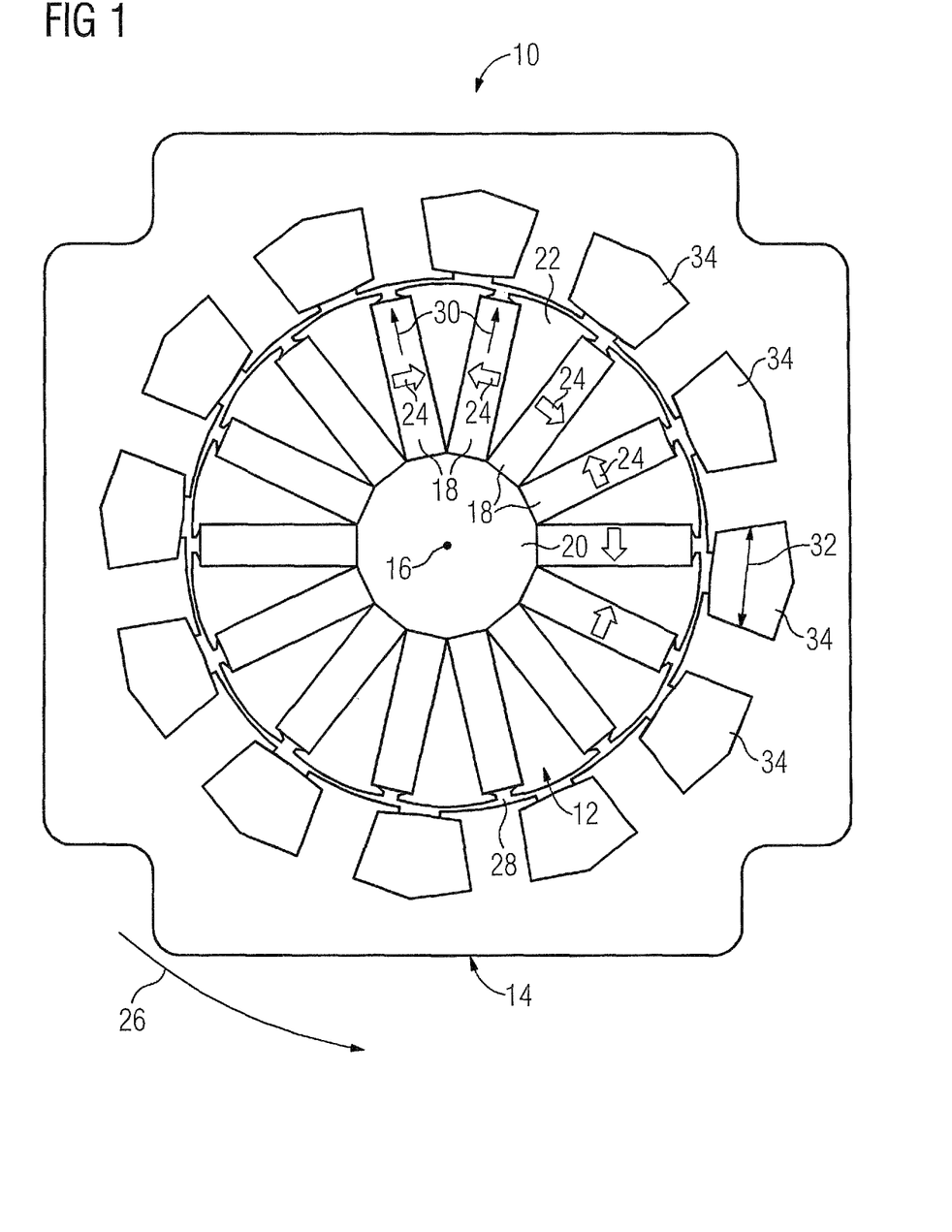
FIG. 1 is a schematic cross-section of an electric machine according to the present invention.

Turning now to the drawing, and in particular to FIG. 1, there is shown a schematic cross-section of one embodiment of an electric machine according to the present invention, generally designated by reference numeral 10. The electric machine 10 includes a stator 14 and a rotor 12 which is mounted inside a stator 14. FIG. 1 shows the electric machine in a cross-section formed perpendicularly to a rotational axis 16 of the rotor 12, with the rotational axis 16 extending in FIG. 1 perpendicularly to the drawing plane. The electric machine 10 is also shown by way of a longitudinal section in FIG. 2, with rotational axis 16 being situated in the sectional plane.

The electric machine 10 can be, for example, a synchronous machine or a servomotor. The electric machine 10 can, for example, be mounted in an electric vehicle as its drive.

The basic shape of rotor 12 is cylindrical and it includes permanent magnets 18 secured radially to a shaft 20. For the sake of clarity only some of permanent magnets 18 have been assigned a reference numeral. The permanent magnets 18 can be, for example, ferrite magnets. Located between neighboring permanent magnets 18 are flux conducting elements 22, respectively, which have a wedge-shaped configuration and constitutes overall a profile part that extends parallel to the rotational axis 16. Again, only some of the flux conducting elements 22 have been assigned a reference numeral in FIG. 1. Each flux conducting element 22 can be realized in the form of a lamination stack for example.

The permanent magnets 18 are tangentially magnetized, i.e. magnetizations 24 are oriented in a circumferential direction 26 of the rotor 12. Two adjacent permanent magnets 18 have opposite magnetization directions. The magnetic fluxes generated by the permanent magnets 18 are deflected by the flux conducting elements 22 radially outward, i.e. in a radial direction 30 relative to the rotational axis 16, to an air gap 28 between the rotor 12 and the stator 14.

The stator 14 includes a magnetically soft flux conducting device 32 which can be formed, for example, in a known manner from a lamination stack. Arranged in the flux conducting device 32 are windings 34 of electric coils for controlled generation of a rotating magnetic field in the electric machine 10. Again, only some of the windings 34 have been assigned a reference numeral in FIG. 1.

Figure 2:
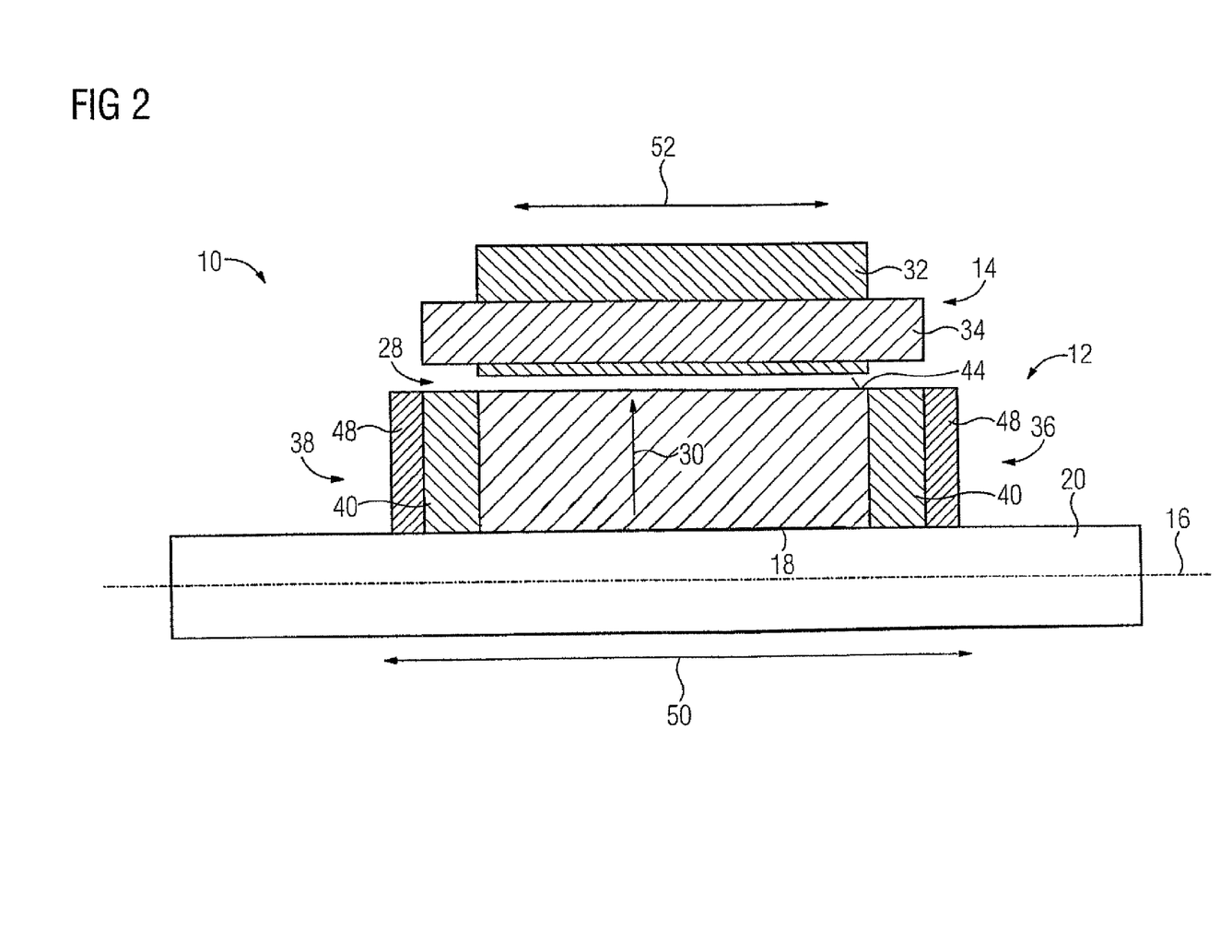
FIG. 2 is a schematic longitudinal section of the electric machine FIG. 1.
Figure 3:
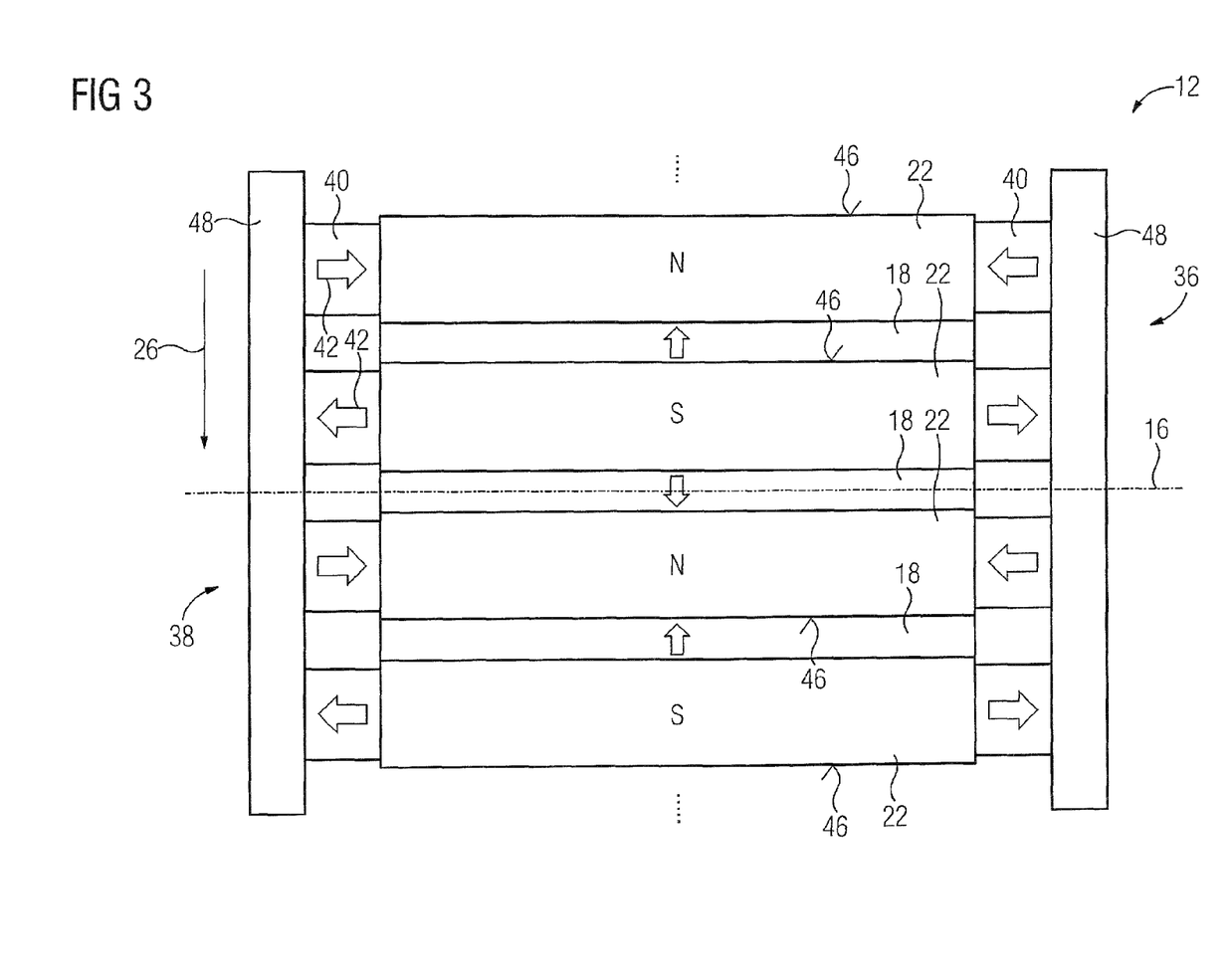
FIG. 3 is a schematic illustration of an external side of a rotor of the electric machine of FIG. 1.

The end-face structure of rotor 12 is explained below in more detail with reference to FIG. 2 and FIG. 3. The rotor 12 has on end faces 36, 38 further permanent magnets 40 arranged on the flux conducting elements 22 on their axial ends, respectively. The permanent magnets 40 can likewise be ferrite magnets. Magnetization 42 of each of the permanent magnets 40 is oriented parallel to the rotational axis 16, i.e. oriented axially. Only some of the permanent magnets 40 and their magnetizing vectors 42 have been assigned reference numerals in FIG. 3.

Each flux conducting element 22 of the rotor 12 is bounded on four different sides by permanent magnets 18, 40. The four bordering permanent magnets 18, 40 have magnetizations which point all either toward or away from the flux conducting element 22. As a result, an alternating sequence of north poles N and south poles S is established on surfaces 46 of the flux conducting elements 22 in the air gap 28 on the external side 44 of the rotor 12.

The magnetic flux of the permanent magnets 40 is closed at each end face 36, 38 via feedback elements 48 made of a magnetically soft material, for example iron. The permanent magnets 18, 40, flux conducting elements 22 and feedback elements 48 form jointly the magnetically active part of the rotor 12. A length 50 of the magnetically active part of rotor 12 in the axial direction, i.e. along the rotational axis 16, is greater than a corresponding length 52 of the flux conducting device 32 of the stator 14 in the axial direction. There is no need for the flux conducting elements 22 to be longer than the flux conducting device 32 of the stator 14.

Figure 5:
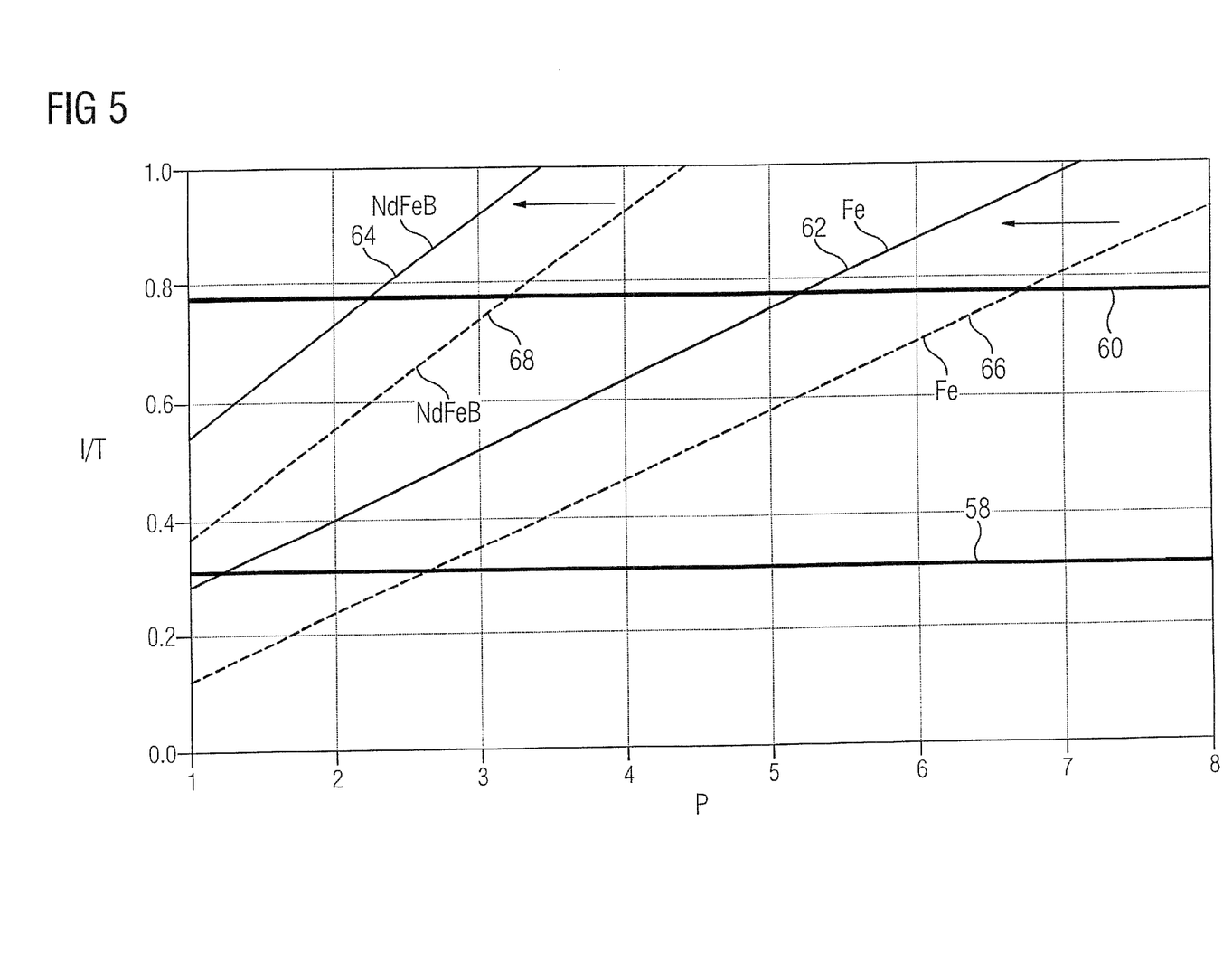
FIG. 5 is a graph relating to a flux density in air gaps of different electric machines.

As a result of the additional permanent magnets 40 on the end faces 36, 38 of the rotor 12, there is a greater magnetic flux in the air gap 28 than would be the case for a conventional rotor without such permanent magnets 40. To illustrate that, a graph is shown in FIG. 5, showing different inductions or flux densities I (here plotted in tesla) as a function of the number of pairs of poles P.

Figure 4:
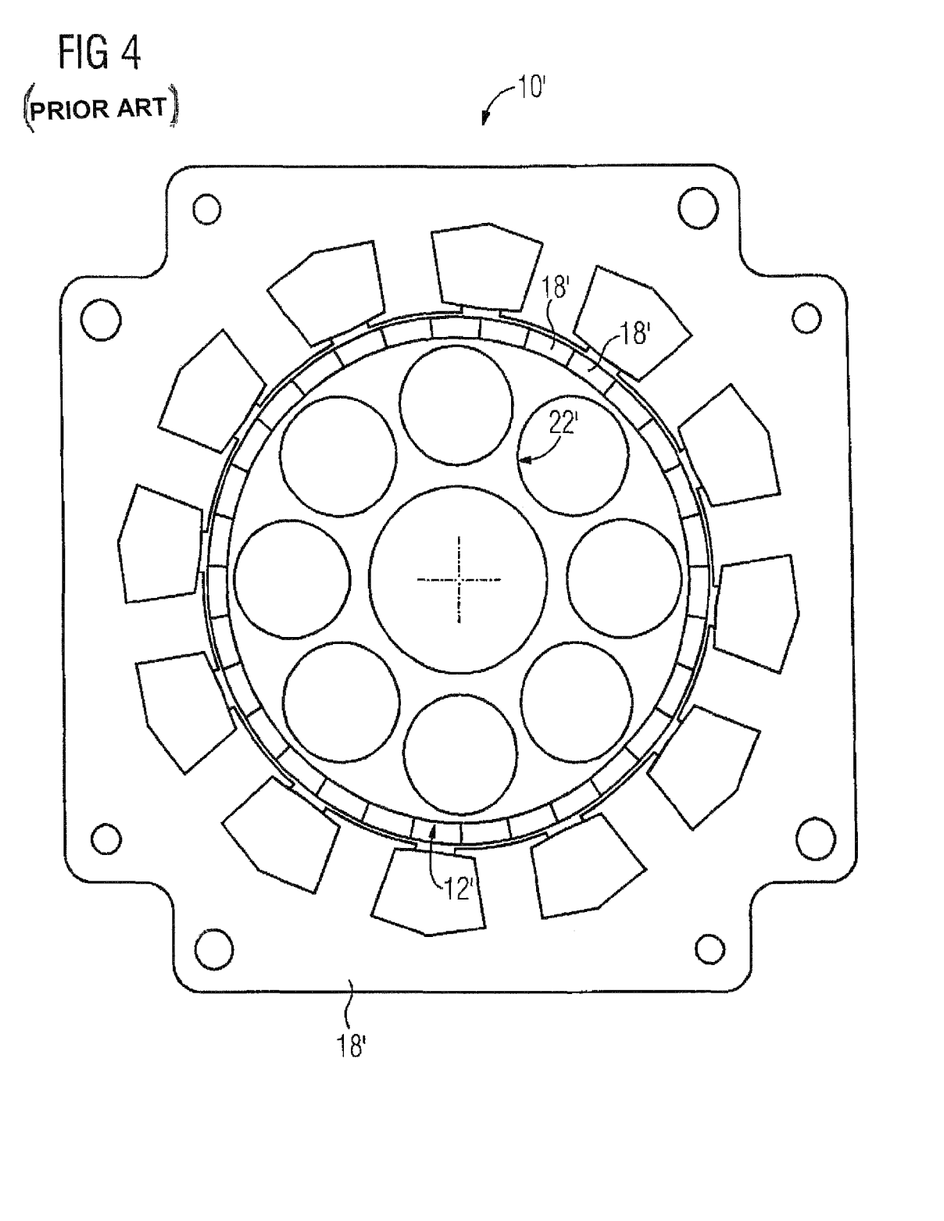
FIG. 4 is a schematic cross-section of a conventional electric machine.

For better understanding of the graph, a structure of a conventional electric machine 10' without radial flux concentration and without additional permanent magnets on end faces of a rotor 12' is illustrated in FIG. 4. FIG. 4 is a cross-section through electric machine 10', with the cross-section being formed in a same manner as the cross-section of FIG. 1. The rotor 12' of the electric machine 10' is formed from a magnetically soft core 22' having a circumference for securement of permanent magnets 18' that have been magnetized in the radial direction outwardly or toward the shaft of the rotor 12'. What results therefrom in a known manner is a sequence of north and south poles around the circumference of the rotor 12'. The permanent magnets 18' can be ferrite magnets or rare earth magnets made of, for example, neodymium-iron-barium (NdFeB). The permanent magnets 18' completely cover rotor 52 in the circumferential direction. Thence, the magnetic flux density I produced by the permanent magnets 18' in the air gap of electric machine 10' is independent of the number of pairs of poles P of the electric machine 10'. This is depicted in FIG. 5 by a horizontal flux density curve 58 over the number of pairs of poles P for the electric machine 10' when ferrite magnets are used, and by a flux density curve 60 when rare earth magnets are used.

In the case of the electric machine 10 according to the invention, the induction or flux density I (given in tesla in FIG. 5) is by contrast dependent on the number of pairs of poles P of the rotor 12. The electric machine 10 has a flux density curve 62 over the number of pairs of poles P when ferrite magnets are used as permanent magnets 18, 40. When rare earth magnets made of NdFeB are used as permanent magnets 18, 40, a flux density curve 64 is established. Shown for comparison are respective flux density curves 66, 68 that would be established if no additional permanent magnets 40 are provided on the ends 36, 38 of the rotor 12 for different numbers of pairs of poles P.

For use as the drive in an electric vehicle with customary rotational speeds (5000 to 10000 rpm), a flux density or induction in the air gap 28 of more than 0.6 tesla, preferably approximately 0.8 tesla, is desired. The conventional electric machine 10' can achieve this value when rare earth magnets are used (see flux density curve 60 in FIG. 5). Without permanent magnets 40, the electric machine 10 would require a number of pairs of poles P=7 to realize a magnetic flux density of 0.8 tesla with ferrite magnets (see flux density curve 66 in FIG. 5). The present invention, however, renders a magnetic air gap induction I possible with a small number of pairs of poles P, because in addition to radial flux concentration an axial concentration is achieved by the presence of the further permanent magnets 40 and their arrangement on flux conducting elements 22. The additional axial flux introduction as a result of the provision of the permanent magnets 40 reduces the radial flux introduction, i.e. the number of pairs of poles P can be decreased. As shown in FIG. 5, the induction curve 62 is already close to the desired flux density of 0.8 tesla when the number of pairs of poles is P=5. Consequently, power loss is reduced, thereby enabling a faster speed for electric machine 10.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. An electric machine, comprising:
    a shaft;
    an armature having a magnetically active part comprising first permanent magnets arranged radially around the shaft, magnetically soft flux conducting elements respectively arranged between the first permanent magnets, and second permanent magnets arranged on a plurality of the flux conducting elements along a direction of extent and having a magnetization oriented parallel to the direction of extent;
    a stator defining with the armature an air gap via which the stator interacts with a magnetic field of the magnetically active part of the armature, said stator having a magnetically active part comprising a magnetically soft flux conducting device, said magnetically active part of the armature being sized to extend in the direction of extent beyond the magnetically soft flux conducting device of the magnetically active part of the stator; and
    a magnetically soft feedback element magnetically coupling the second permanent magnets with one another, with a magnetic flux of the second permanent magnets being closed on an end face of the armature,
    wherein said second permanent magnets and said magnetically soft feedback element each have a radially inner end attached directly to the shaft.

2. The electric machine of claim 1, wherein the flux conducting elements are sized to magnetically couple the adjacent first permanent magnets with an air-gap-bounding surface region of the flux conducting elements to thereby effect a flux concentration, with the magnetization of the first permanent magnets oriented transversely to a normal vector of the surface region.

3. The electric machine of claim 1, wherein the magnetization of the first permanent magnets is oriented perpendicularly to the normal vector of the surface region.

4. The electric machine of claim 1, wherein the armature is configured as a rotor having a cylindrical shape and rotating about a rotational axis, said rotational axis extending in a direction which corresponds to the direction of extent of the magnetically active part of the rotor.

5. The electric machine of claim 1, wherein each of the flux conducting elements is formed by a lamination stack.

6. The electric machine of claim 1, wherein the first permanent magnets are ferrite magnets.

7. The electric machine of claim 1, wherein the armature has a number of pairs of poles of less than six, and a flux density in the air gap measures on average more than 0.6 tesla.

8. An armature configured as a rotor for an electric machine, comprising:
    a shaft;
    first permanent magnets arranged radially around the shaft and magnetized tangentially to a circumferential direction in a cross-section perpendicular to a rotational axis, said first permanent magnets having each one radially inner end attached to the shaft such that the radially inner ends of all of the permanent magnets are in contact with an outer surface of the shaft uninterruptedly over an entire circumference of the shaft;
    magnetically soft flux conducting elements respectively arranged between the first permanent magnets and configured as wedge-shaped stacks of lamination; and
    second axially magnetized permanent magnets arranged on axial end faces of the flux conducting elements so that each flux conducting element is bounded on four different sides by the first and second permanent magnets, respectively, said flux conducting element magnetically coupling the first and second permanent magnets with a surface region of an external side of the rotor, said first and second permanent magnets having magnetizations either pointing all toward or away from the flux conducting element to thereby form a magnetic pole on the surface region.

* * * * *